US008570401B2

(12) United States Patent
Manabe

(10) Patent No.: US 8,570,401 B2
(45) Date of Patent: Oct. 29, 2013

(54) IMAGE COMBINING APPARATUS, IMAGE COMBINING METHOD AND PROGRAM PRODUCT

(75) Inventor: Yoshitsugu Manabe, Fussa (JP)

(73) Assignee: Casio Computer Co., Ltd., Tokyo (JP)

(*) Notice: Subject to any disclaimer, the term of this patent is extended or adjusted under 35 U.S.C. 154(b) by 228 days.

(21) Appl. No.: 13/178,905

(22) Filed: Jul. 8, 2011

(65) Prior Publication Data
US 2012/0008015 A1 Jan. 12, 2012

(30) Foreign Application Priority Data

Jul. 9, 2010 (JP) .................................. 2010-157280
Mar. 1, 2011 (JP) .................................. 2011-044529

(51) Int. Cl.
H04N 9/68 (2006.01)
H04N 5/228 (2006.01)
H04N 5/262 (2006.01)
H04N 5/217 (2011.01)
H04N 5/235 (2006.01)
G03B 7/00 (2006.01)
G06K 9/00 (2006.01)
G06K 9/40 (2006.01)

(52) U.S. Cl.
USPC ........ 348/234; 348/222.1; 348/239; 348/241; 348/362; 382/162; 382/165; 382/167; 382/260; 382/274

(58) Field of Classification Search
USPC ............... 348/207.99, 208.99–208.16, 222.1, 348/229.1–230.1, 234–253, 362–368; 382/162–172, 254–275
See application file for complete search history.

(56) References Cited

U.S. PATENT DOCUMENTS

| 6,466,253 | B1* | 10/2002 | Honjoh ............................ 348/36 |
| 7,301,563 | B1* | 11/2007 | Kakinuma et al. ....... 348/208.13 |
| 7,480,421 | B2 | 1/2009 | Henley |
| 8,115,818 | B2* | 2/2012 | Sawada .................... 348/208.13 |
| 8,373,776 | B2* | 2/2013 | Iijima et al. ................... 348/241 |
| 2004/0136603 | A1* | 7/2004 | Vitsnudel et al. ............. 382/254 |

(Continued)

FOREIGN PATENT DOCUMENTS

| JP | 2004-229259 A | 8/2004 |
| JP | 2006-345509 A | 12/2006 |
| JP | 2007-325145 A | 12/2007 |

OTHER PUBLICATIONS

Japanese Office Action dated Jun. 12, 2012 (and English translation thereof) in counterpart Japanese Application No. 2011-044529.

Primary Examiner — Michael Osinski
(74) Attorney, Agent, or Firm — Holtz, Holtz, Goodman & Chick, PC

(57) ABSTRACT

A plurality of image data different in exposure condition are separated into a plurality of luminance component image data and a plurality of color-difference component image data, and the luminance component image data and the color-difference component image data are inputted to an image combining portion 11. A luminance component combining section 21 averages and smoothes the plurality of image data different in exposure condition and sets combining rates of the plurality of image data different in exposure condition by using the smoothed average luminance component image data. The separated plurality of luminance component image data are combined by using the set combining rates with respect to each attention pixel. On the other hand, a color-difference component combining portion 22 combines the separated plurality of color-difference component image data by using the combining rates used in the luminance component combining section 21.

6 Claims, 9 Drawing Sheets

(56) References Cited

U.S. PATENT DOCUMENTS

| | | | |
|---|---|---|---|
| 2004/0207734 A1* | 10/2004 | Horiuchi | 348/229.1 |
| 2008/0050031 A1* | 2/2008 | Itoh et al. | 382/260 |
| 2009/0284610 A1* | 11/2009 | Fukumoto et al. | 348/208.99 |
| 2010/0231748 A1* | 9/2010 | Takeda | 348/229.1 |
| 2010/0246939 A1* | 9/2010 | Aisaka et al. | 382/156 |
| 2010/0260436 A1* | 10/2010 | Watanabe et al. | 382/266 |
| 2011/0096179 A1* | 4/2011 | Border et al. | 348/208.4 |
| 2011/0115942 A1* | 5/2011 | Kurita et al. | 348/223.1 |
| 2012/0020556 A1* | 1/2012 | Manabe | 382/167 |
| 2013/0016253 A1* | 1/2013 | Kobayashi | 348/239 |

\* cited by examiner

US 8,570,401 B2

IMAGE COMBINING APPARATUS, IMAGE COMBINING METHOD AND PROGRAM PRODUCT

CROSS REFERENCE TO RELATED APPLICATION(S)

The present disclosure relates to the subject matters contained in Japanese Patent Application No. 2010-157280 filed on Jul. 9, 2010 and Japanese Patent Application No. 2011-044529 filed on Mar. 1, 2011, which are incorporated herein by reference in its entirety.

FIELD

The present invention relates to a technique for generating a composite image with a dynamic range widened by use of a plurality of images continuously shot in various exposure conditions.

BACKGROUND

A photographic image has been recently subjected to various kinds of image processing for dramatic impact in viewing the image.

As such image processing, there is known a processing which is shown in JP-A-2006-345509. The processing is to appropriately compose images taken in various exposure conditions to generate a whiteout-free and shadowing-free composite image (hereinafter referred to as "High Dynamic Range (HDR) image").

However, the aforementioned image combining technique is not aimed at appropriate adjustment of saturation.

SUMMARY

The present invention is accomplished upon such circumstances. An object of the invention is to provide an HDR image with less whiteout or shadowing and saturation of which is appropriately adjusted.

To achieve the foregoing object, according to a first aspect of the invention, there is provided an image combining apparatus including: a separator configured to separate each of a plurality of image data captured in different exposure conditions and at the same field angle into a plurality of first image data and a plurality of second image data, each of the plurality of first image data composed of luminance components specified in a certain color space, each of the plurality of second image data composed of other components than the luminance components; a first combining unit configured to combine, by using certain combining rates, the separated plurality of first image data that are different in exposure condition; and a second combining unit configured to combine, by using the certain combining rates used for combining by the first combining unit, the plurality of second image data that are different in exposure condition.

To achieve the foregoing object, according to a second aspect of the invention, there is provided an image combining method including: separating each of a plurality of image data captured in different exposure conditions and at the same field angle into a plurality of first image data and a plurality of second image data, each of the plurality of first image data composed of luminance components specified in a certain color space, each of the plurality of second image data composed of other components than the luminance components; combining, by using certain combining rates, the separated plurality of first image data that are different in exposure condition; and combining, by using the certain combining rates, the plurality of second image data that are different in exposure condition.

To achieve the foregoing object, according to a third aspect of the invention, there is provided a program product for causing a computer to serve as: a separator configured to separate each of a plurality of image data captured in different exposure conditions and at the same field angle into a plurality of first image data and a plurality of second image data, each of the plurality of first image data composed of luminance components specified in a certain color space, each of the plurality of second image data composed of other components than the luminance components; a first combining unit configured to combine, by using certain combining rates, the separated plurality of first image data that are different in exposure condition; and a second combining unit configured to combine, by using the certain combining rates used for combining by the first combining unit, the plurality of second image data that are different in exposure condition.

BRIEF DESCRIPTION OF THE DRAWINGS

A general configuration that implements the various features of the invention will be described with reference to the drawings. The drawings and the associated descriptions are provided to illustrate embodiments of the invention and should not limit the scope of the invention.

DETAILED DESCRIPTION OF THE EMBODIMENTS

An exemplary embodiment of the invention will be described below with reference to the drawings.

Figure 1:
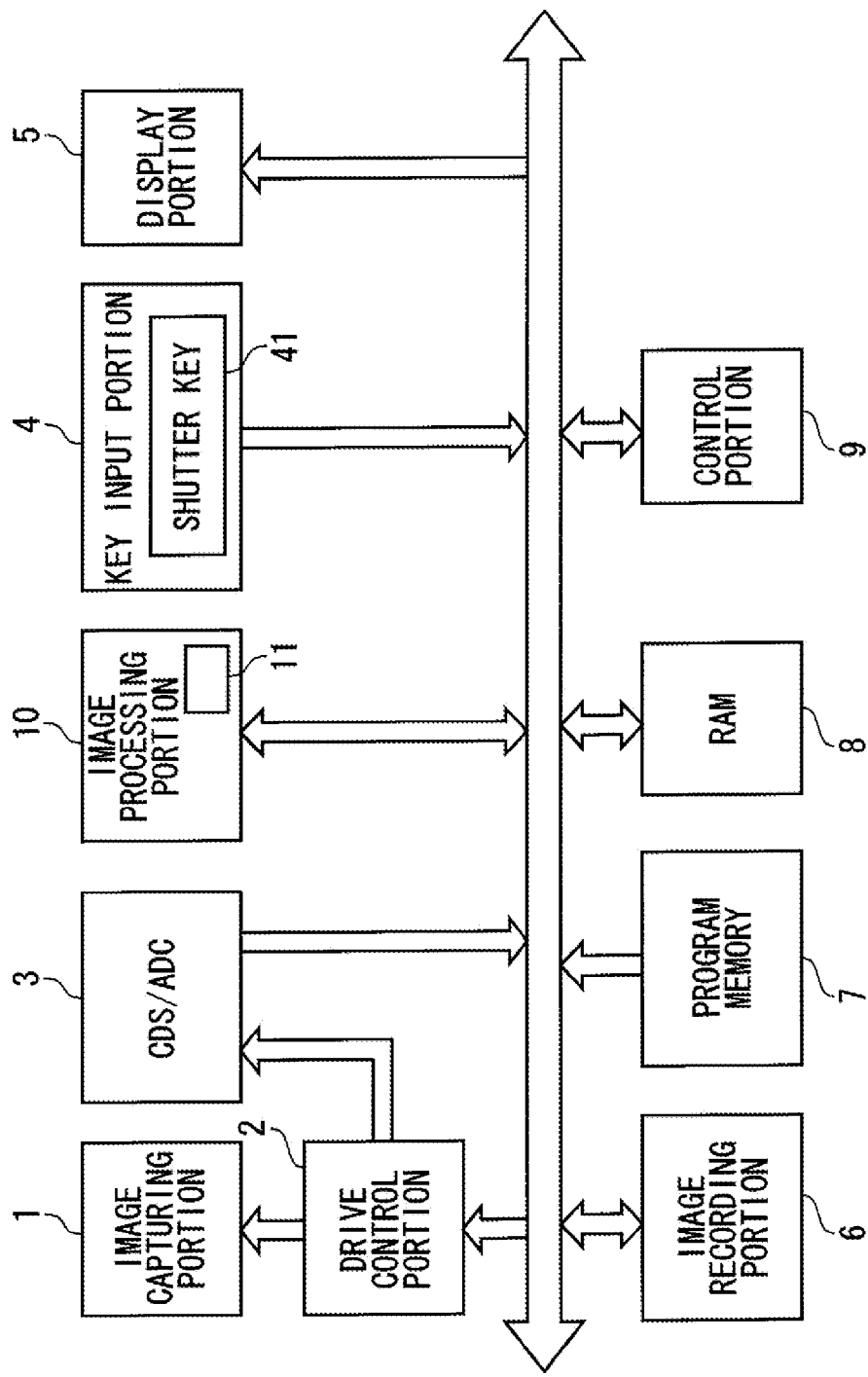
FIG. 1 is a circuit diagram of an image capturing apparatus according to an exemplary embodiment of the invention.

FIG. 1 is a circuit diagram of an image capturing apparatus equipped with an image processing apparatus according to an exemplary embodiment of the invention.

The image capturing apparatus has an image capturing portion 1, a drive control portion 2, a CDS/ADC 3, a key input portion 4, a display portion 5, an image recording portion 6, a program memory 7, a RAM 8, a control portion 9, and an image processing portion 10.

The key input portion 4 has a shutter key 41 for detecting a photographer's recording instruction. The image processing portion 10 has an image combining portion 11 corresponding to the characteristic configuration of the invention. These are connected to one another through a bus line.

In FIG. 1, the image capturing portion 1 includes an image sensor such as a CMOS, an RGB color filter provided on the image sensor, and a driver which holds light intensity as stored electric charges for a certain time under control of the drive control portion 2 and outputs these electric charges as an analog captured image signal to the CDS/ADC 3.

The image capturing portion 1 detects a photographer's shooting instruction via the shutter key 41, the control portion 9 and the drive control portion 2 to thereby acquire a plurality of images (color images) including underexposure image data, correct exposure image data and overexposure image data in various exposure conditions (shutter speeds or aperture values).

The CDS/ADC 3 is a circuit into which an analog captured image signal is inputted in accordance with an optical image of a subject outputted from the image capturing portion 1. The CDS/ADC 3 includes a CDS which holds the input captured image signal, a gain control amplifier (AGC) which amplifies the captured image signal, and an A/D converter (ADC) which converts the amplified captured image signal into a digital captured image signal.

Incidentally, control regarding adjustment of the gain control amplifier is performed based on an instruction given from the drive control portion 2. Accordingly, even when a plurality of images are acquired in spite of the same exposure condition, it is possible to generate images in different conditions in accordance with successive change of the RGB gain control amplifier or image hue.

The key input portion 4 has, in addition to the shutter key 41, various keys for detecting mode switching to an image capturing mode, display switching, etc. in order to acquire and record images according to the embodiment.

The display portion 5 has a function of displaying a composite image subjected to an image combining processing.

The image recording portion 6 records and stores coded image data (image files) in JPEG format after execution of the image combining processing according to the invention.

The program memory 7 stores programs to be executed by the control portion 9 and the image processing portion 10, so that the control portion 9 reads the programs where appropriate.

The RAM 8 has a function of temporarily storing data in progress generated by various kinds of processing.

The control portion 9 generally controls the processing operation of the image capturing apparatus.

The image processing portion 10 has the image combining portion 11 for performing the image combining processing according to the embodiment in addition to image data encoding/decoding processing.

The function of performing the image combining processing will be described below with reference to FIG. 2 which is a functional block diagram.

The term "image combining processing" used in this embodiment means a processing which generates HDR image data by applying pixel addition image combining to a plurality of image data (underexposure image data, correct exposure image data and overexposure image data) in different exposure conditions while changing the combining ratio thereof according to a luminance value.

Particularly in the HDR image combining processing according to this embodiment, data of each of images continuously shot in various exposure conditions is separated into a luminance component and color difference components among the three elementary components of a luminance signal (Y) indicating a luminance component specified in YUV color space and other components, specifically, a blue component color difference signal (U) and a red component color difference signal (V), so that color difference components as well as luminance components after separation are combined pixel by pixel. The separation into the luminance component and the color difference components is performed by the image processing portion 10.

The HDR image data obtained as a result of this image combining are provided as data having a wide dynamic range and having correctly adjusted saturation.

The image combining portion 11 combines correct exposure image data, overexposure image data and underexposure image data.

The term "correct exposure" used herein means not only correct exposure in image capturing condition but also intermediate exposure between the exposure condition during photographing of overexposure image data and the exposure condition during photographing of underexposure image data.

Image data having only a luminance component in the correct exposure image data is defined as correct exposure luminance component image data. Image data having only a luminance component in the overexposure image data is defined as overexposure luminance component image data. Image data having only a luminance component in the underexposure image data is defined as underexposure luminance component image data.

Image data having only color difference components in the correct exposure image data is defined as correct exposure color-difference component image data. Image data having only color difference components in the overexposure image data is defined as overexposure color-difference component image data. Image data having only color difference components in the underexposure image data is defined as underexposure color-difference component image data.

Figure 2:
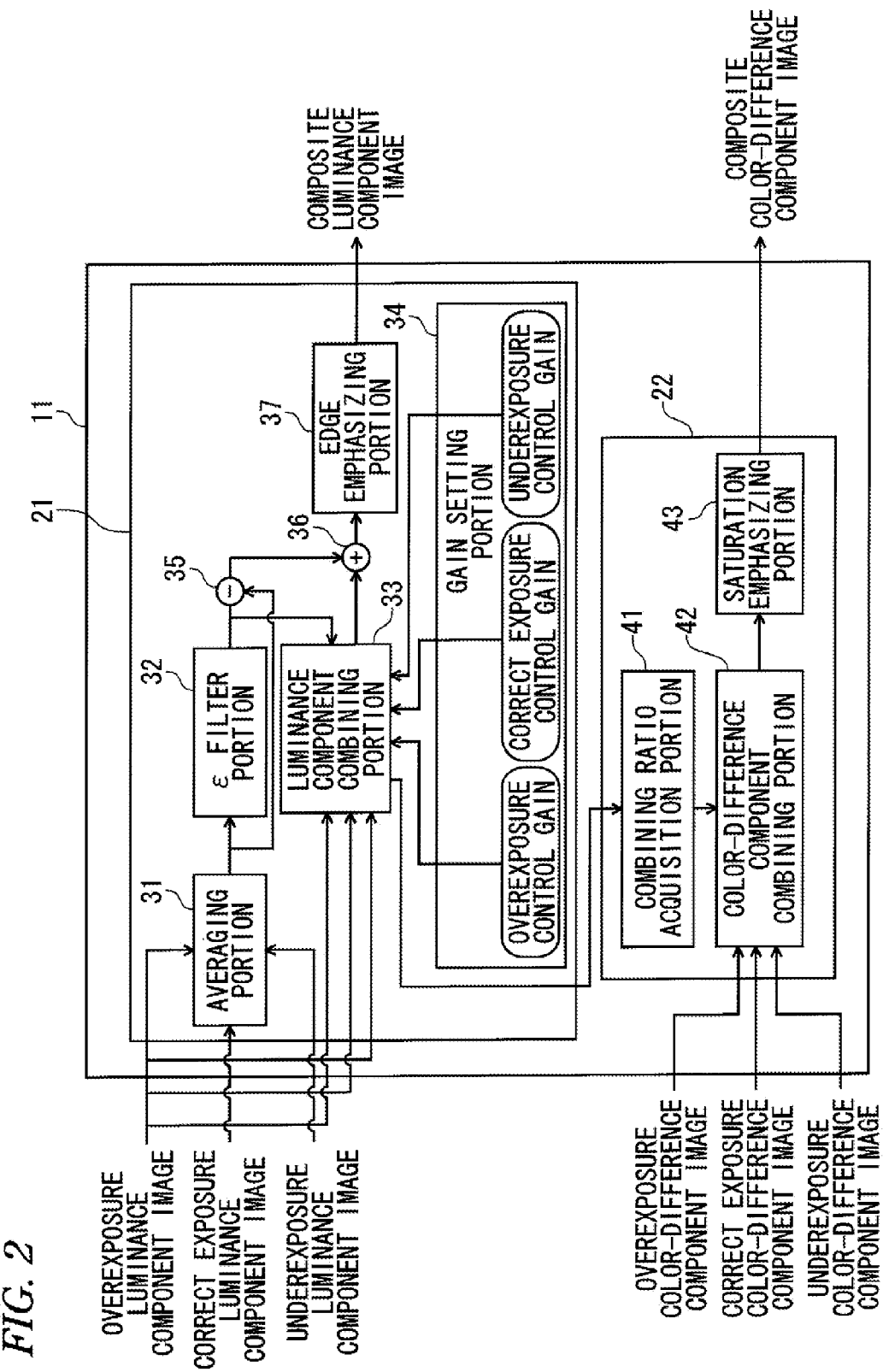
FIG. 2 is a functional block diagram showing functional configuration with respect to a function for executing a combining processing in the embodiment.

In FIG. 2, correct exposure luminance component image data, overexposure luminance component image data, underexposure luminance component image data, correct exposure color-difference component image data, overexposure color-difference component image data and underexposure color-difference component image data are inputted when continuously captured image data are processed respectively.

As shown in FIG. 2, the image combining portion 11 has a luminance component combining section 21, and a color-difference component combining section 22.

The luminance component combining section 21 combines correct exposure luminance component image data, overexposure luminance component image data and underexposure luminance component image data to thereby generate composite luminance component image data. Incidentally, a series of processing for generating composite luminance component image data will be hereinafter referred to as luminance component combining processing.

On the other hand, the color-difference component combining section 22 combines correct exposure color-difference component image data, overexposure color-difference component image data and underexposure color-difference component image data to thereby generate composite color-difference component image data. Incidentally, a series of processing for generating composite color-difference component image data will be referred to as color-difference component combining processing.

The composite luminance component image data generated by the luminance component combining processing and the composite color-difference component image data generated by the color-difference combining processing are outputted from the image combining portion 11.

Incidentally, in the luminance component combining processing, correct exposure luminance component image data, overexposure luminance component image data and underexposure luminance component image data are combined in accordance with certain combining rates.

When, for example, correct exposure luminance component image data, overexposure luminance component image data and underexposure luminance component image data have combining rates of 70%, 30% and 0%, data obtained as a result of mixing 70% of correct exposure luminance component image data and 30% of overexposure luminance component image data is composite luminance component image data.

On the other hand, also in the color-difference component combining processing, correct exposure color-difference component image data, overexposure color-difference component image data and underexposure color-difference component image data are combined in accordance with certain combining rates to adjust saturation.

In this embodiment, the combining rates used in the aforementioned luminance component combining processing are used directly as combining rates in the color-difference component combining processing.

Incidentally, the combining rates used in the color-difference component combining processing may be set independently of the combining rates used in the luminance component combining processing.

The luminance component combining section 21 and the color-difference component combining section 22 which form the image combining portion 11 will be described below in detail.

The luminance component combining section 21 will be described in detail first.

The luminance component combining section 21 has an averaging portion 31, an ε filter portion 32, a luminance component combining portion 33, a gain setting portion 34, a subtraction portion 35, a contrast emphasizing portion 36, and an edge emphasizing portion 37.

The averaging portion 31 averages correct exposure luminance component image data, overexposure luminance component image data and underexposure luminance component image data respectively and feeds image data as a result of the averaging (hereinafter referred to as "average luminance component image data") to the ε filter portion 32.

The ε filter portion 32 applies an ε filter (nonlinear filter) to the average luminance component image data fed from the averaging portion 31 to thereby generate smoothed image data and feeds the smoothed image data to the luminance component combining portion 33 and the subtraction portion 35.

The smoothed average luminance component image data outputted from the ε filter portion 32 is used as a material for determining combining rates in the luminance component combining portion 33.

The luminance component combining portion 33 combines correct exposure luminance component image data, overexposure luminance component image data and underexposure luminance component image data in certain combining rates.

Specifically, for example, the luminance component combining portion 33 sets, as attention pixels, pixels located in the same position (coordinates) among respective pixels constituting correct exposure luminance component image data, overexposure luminance component image data and underexposure luminance component image data, sets combining rates for the attention pixels respectively, and combines the attention pixels in the set combining rates at a pixel-value level.

Figure 3:
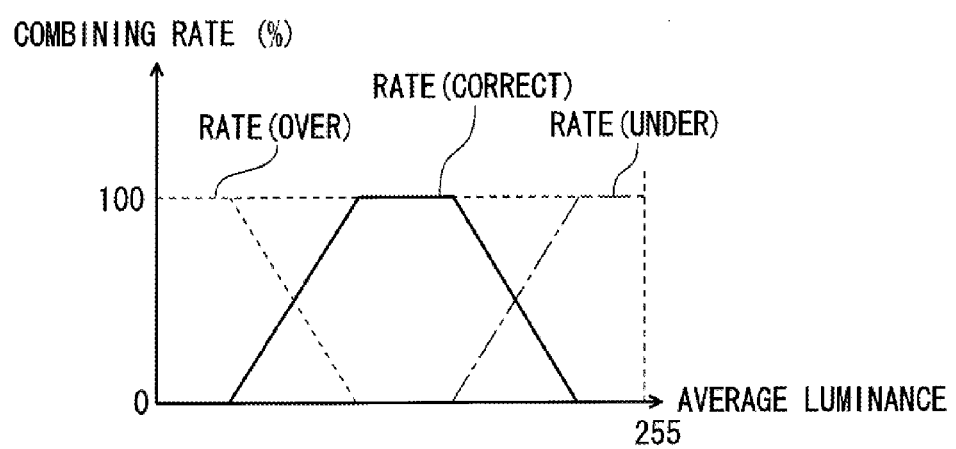
FIG. 3 is a view showing an example of a combining rate setting table.

FIG. 3 shows an example of a combining rate setting table stored in the program memory 7.

In FIG. 3, the horizontal axis shows the luminance value of an average luminance component image (a value in a range of 0 to 255), and the vertical axis shows a combining rate (%).

The line drawn as a solid line shows a correct exposure luminance component image combining rate "Rate(correct)" applied to the correct exposure luminance component image.

The line drawn as a broken line shows an overexposure luminance component image combining rate "Rate(over)" applied to the overexposure luminance component image.

The line drawn as a one-dot chain line shows an underexposure luminance component image combining rate "Rate(under)" applied to the underexposure luminance component image.

The luminance component combining portion 33 sets "Rate(correct)", "Rate(over)" and "Rate(under)" based on the luminance value of the average luminance component image data.

When, for example, the luminance value of average luminance component image data is low, "Rate(over)", "Rate(correct)" and "Rate(under)" are set so that the combining rate of image data captured in an overexposure condition becomes high.

On the other hand, when the luminance value of average luminance component image data is high, "Rate(over)", "Rate(correct)" and "Rate(under)" are set so that the combining rate of image data captured in an underexposure condition becomes high.

The composite value "Y(mix)" of luminance of combined attention pixels is calculated and determined in accordance with the following expression (1):

$$Y(mix)=Rate(under)*Y(under)+Rate(correct)*Y(correct)+Rate(over)*Y(over) \quad (1)$$

in which Y(under) is a luminance value of each attention pixel of underexposure luminance component image data, Y(correct) is a luminance value of the attention pixel of correct exposure luminance component image data, and Y(over) is a luminance value of the attention pixel of overexposure luminance component image data.

The luminance component combining portion 33 successively sets, as an attention pixel, pixels located in the same coordinates among correct exposure luminance component image data, overexposure luminance component image data and underexposure luminance component image data. Whenever the attention pixel is set, the luminance component combining portion 33 repeats the aforementioned series of processing to generate composite luminance component image data.

FIGS. 4A to 4F show images obtained by processing in the luminance component combining portion 33.

Figure 4A:
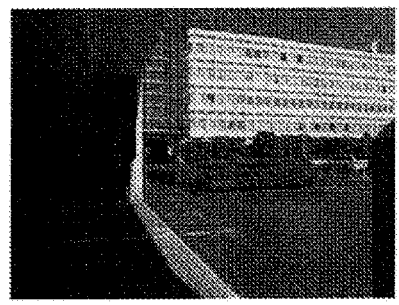
FIG. 4A shows an example of an underexposure luminance component image.

FIG. 4A shows an example of an underexposure luminance component image.

Figure 4B:
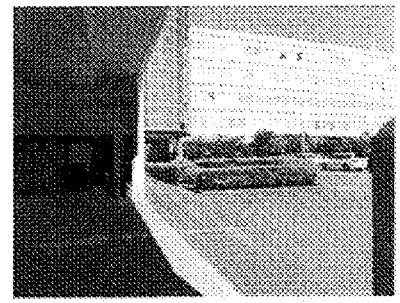
FIG. 4B shows a correct exposure luminance component image captured at the same field angle as the field angle of the image shown in FIG. 4A by continuous shooting.

FIG. 4B shows a correct exposure luminance component image captured at the same field angle as the field angle of the image shown in FIG. 4A by continuous shooting.

Figure 4C:
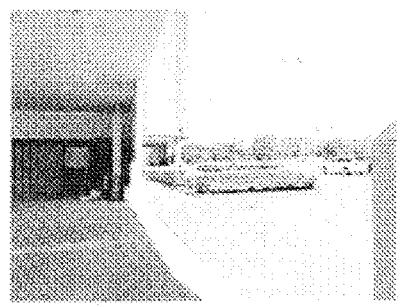
FIG. 4C shows an overexposure luminance component image captured at the same field angle as the field angles of the images shown in FIGS. 4A and 4B by continuous shooting.

FIG. 4C shows an overexposure luminance component image captured at the same field angle as the field angles of the images shown in FIGS. 4A and 4B by continuous shooting.

Figure 4D:
FIG. 4D shows an average luminance component image.

FIG. 4D shows an average luminance component image.

Figure 4E:
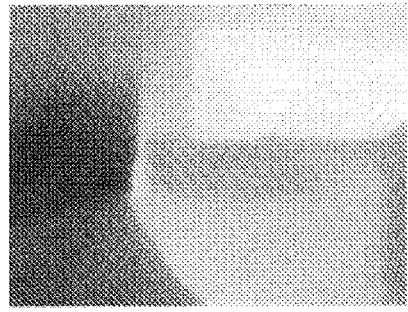
FIG. 4E shows a smoothed average luminance component image.

FIG. 4E shows a smoothed average luminance component image.

Figure 4F:
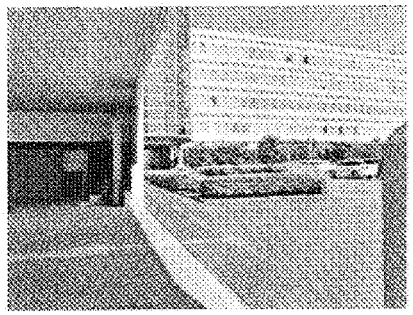
FIG. 4F shows a composite luminance component image.

FIG. 4F shows a composite luminance component image.

The luminance component combining portion 33 adjusts brightness of the composite luminance component image data generated as described above.

Specifically, the gain setting portion 34 sets a control gain "Gain(correct)" to be applied to correct exposure luminance component image data, a control gain "Gain(over)" to be applied to overexposure luminance component image data and a control gain "Gain(under)" to be applied to underexposure luminance component image data as gains for adjusting brightness of composite luminance component image data.

The control gains "Gain(correct)", "Gain(over)" and "Gain (under)" set by the gain setting portion 34 are multiplied by Rate(correct), Rate(over) and Rate(under) respectively. As a result, brightness of composite luminance component image data is adjusted.

Figure 5:
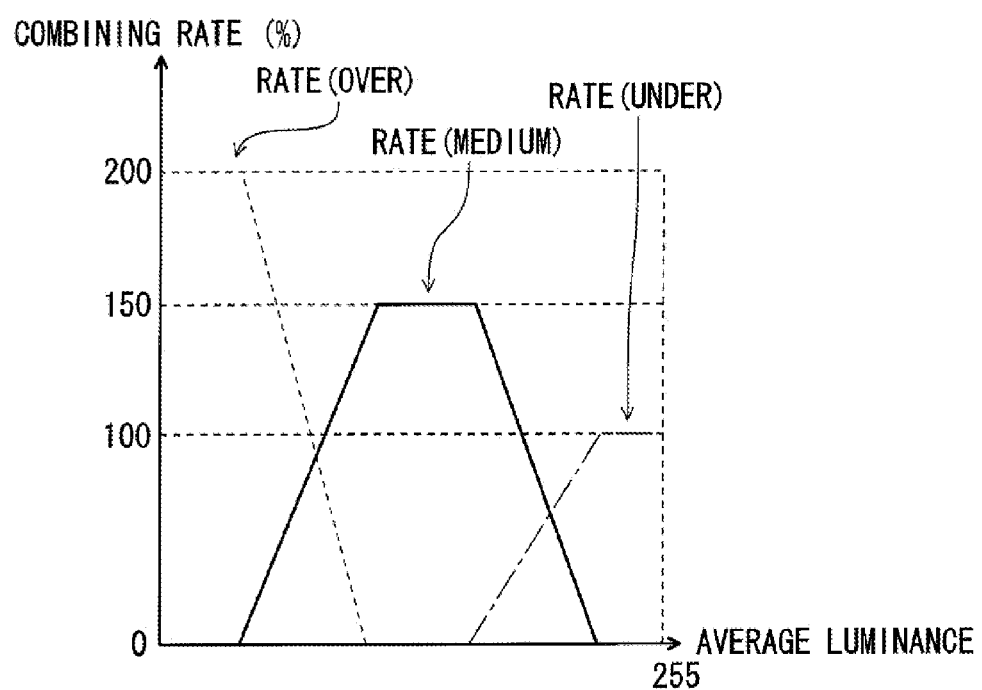
FIG. 5 is a view showing an example of a combining rate table in which control gain is reflected.

FIG. 5 shows an example of a table of Rate(correct), Rate (over) and Rate(under) multiplied by the control gains "Gain (correct)", "Gain(over)" and "Gain(under)" respectively.

The table of FIG. 5 is a result obtained when "Gain(over) "=2.0, "Gain(correct)=1.5 and "Gain(under)"=1.0 are set for the table of FIG. 3.

Figure 6A:
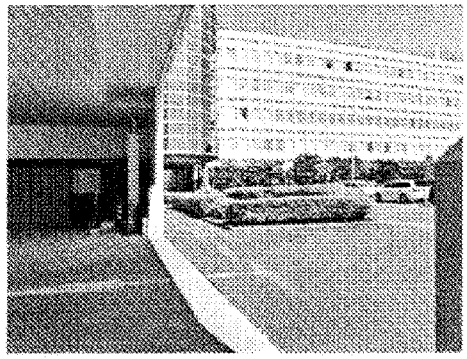
FIGS. 6A and 6B are views showing a brightness adjusting effect based on the control gain.

FIG. 6A shows composite image data in the case where the control gains "Gain(correct)", "Gain(over)" and "Gain(under)" are not multiplied, that is, a composite image obtained by image combining based on the table of FIG. 3.

Figure 6B:
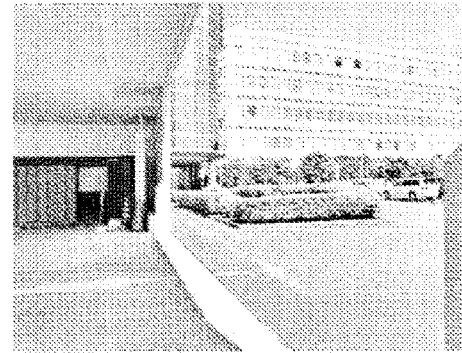

FIG. 6B shows composite image data in the case where the control gains "Gain(correct)", "Gain(over)" and "Gain(under)" are multiplied, that is, a composite image obtained by image combining based on the table of FIG. 5.

The composite image data in FIG. 6B has a dark part adjusted so as to be brightened compared with the composite image data in FIG. 6A.

In FIG. 2, average luminance component image data outputted from the averaging portion 31 is fed to the subtraction portion 35.

The subtraction portion 35 calculates a difference between average luminance component image data and smoothed average luminance component image data and outputs the resulting difference data as a contract component to the contrast emphasizing portion 36.

The contrast emphasizing portion 36 adds the contrast component outputted from the subtraction portion 35 to each attention pixel of the composite luminance component image data outputted from the luminance component combining portion 33.

The contrast emphasizing portion 36 adjusts an addition level of the contrast component in accordance with the luminance value of the composite luminance component image data to prevent whiteout or shadowing from being caused by the aforementioned addition of the contrast component.

Incidentally, the contrast component "Y(c)" to be added and adjusted is given by the following expression (2):

$$Y(c) = Y(\text{ave}) - Y(\text{ave})\epsilon + C \quad (2)$$

in which Y(ave) is a contrast component of average luminance component image data, Y(ave)ϵ is a contrast component of smoothed average luminance component image data, and C is a constant (=127).

The pixel value Y(r) of each attention pixel of the composite luminance component image data outputted from the contrast emphasizing portion 36 in this manner is given by the following expression (3):

$$Y(r) = Y(\text{mix}) + (Y(c) - C) * \text{add\_lev} \quad (3)$$

in which add_lev is the addition level with respect to the attention pixel to be processed.

In this manner, the contrast emphasizing portion 36 calculates the pixel value Y(r) of each attention pixel of the contrast-emphasized composite image in accordance with the expression (3).

In this case, the addition level add_lev is set based on a luminance value of each attention pixel of the composite luminance component image data outputted from the luminance component combining portion 33 and the table for setting the addition level prepared in the program memory 7 in advance.

Figure 7A:
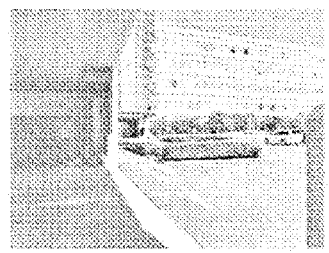
FIGS. 7A to 7C are views showing a contrast emphasizing effect.

FIG. 7A shows an example of an image expressed in contrast component.

Figure 7B:

FIG. 7B shows a composite luminance component image before the contrast emphasizing processing performed by the contrast emphasizing portion 36.

Figure 7C:

FIG. 7C shows a composite luminance component image after the contrast emphasizing processing performed by the contrast emphasizing portion 36.

The contrast-emphasized composite luminance component image data generated by the contrast emphasizing portion 36 in this manner is further fed to the edge emphasizing portion 37.

The edge emphasizing position 37 applies an edge emphasizing processing to each attention pixel of composite luminance component image data having edge components made insufficient by the averaging portion 31 in accordance with a ratio of combining rates.

Specifically, the edge emphasizing portion 37 applies an edge emphasizing processing to each attention pixel of composite luminance component image data after performing setting so that the emphasizing level increases as the ratio between the correct exposure combining rate "Rate(correct)" and the overexposure combining rate "Rate(over)" and/or as the ratio between the correct exposure combining rate "Rate (correct)" and the underexposure combining rate "Rate(under)" comes close to the same ratio.

Incidentally, when edge emphasis is applied to each of correct exposure luminance component image data, overexposure luminance component image data and underexposure luminance component image data in advance, processing in the edge emphasizing portion 37 is omitted.

Composite luminance component image data subjected to the edge emphasizing processing by the edge emphasizing portion 37 is outputted as output data of the luminance component combining section 21.

The color-difference component combining section 22 will be described below in detail.

As shown in FIG. 2, the color-difference component combining section 22 has a combining rate acquisition portion 41, a color-difference component combining portion 42, and a saturation emphasizing portion 43.

The combining rate acquisition portion 41 acquires combining rates "Rate(over)", "Rate(correct)" and "Rate(under)"

used for combining attention pixels in the luminance component combining portion 33 of the luminance component combining section 21.

The combining rate acquisition portion 41 further acquires combining rates "Rate(over)", "Rate(correct)" and "Rate(under)" (see FIG. 5) multiplied by control gains "Gain(correct)", "Gain(over)" and "Gain(under)" set by the gain setting portion 34.

Incidentally, if necessary, the combining rate acquisition portion 41 may acquire combining rates set based on the table of FIG. 3, that is, combining rates before brightness adjustment using control gains set by the gain setting portion 34.

The color-difference component combining portion 42 combines pixel values of correct exposure color-difference component image data, overexposure color-difference component image data and underexposure color-difference component image data with respect to each attention pixel by directly using combining rates acquired by the combining rate acquisition portion, that is, combining rates used for combining attention pixels in the luminance component combining portion 33 of the luminance component combining section 21.

The color-difference component portion 42 calculates the composite value UV(mix) of color-difference components of attention pixels to be combined by calculating the following expression (4):

$$UV(mix) = Rate(under) * UV(under) + Rate(correct) * UV(correct) + Rate(over) * UV(over) \quad (4)$$

in which UV(under) is a color-difference value of each attention pixel of underexposure color-difference component image data, UV(correct) is a color-difference value of the attention pixel of correct exposure color-difference component image data, and UV(over) is a color-difference value of the attention pixel of overexposure color-difference component image data.

The composite image data generated by the color-difference component combining portion 42 of the color-difference component combining section 22 in this manner is hereinafter referred to as "composite color-difference component image data".

Incidentally, the color-difference component combining section 22 may operate synchronously with the luminance component combining section 21 or may operate asynchronously.

When the color-difference component combining section 22 operates asynchronously, for example, the combining rates Rate(correct), Rate(over) and Rate(under) used in the luminance component combining section 21 are temporarily stored in a buffer (not shown) so that the combining rate acquisition portion 41 acquires the combining rates stored in the buffer.

In this case, a mechanism is further provided in the image combining portion 11. The mechanism enables the color-difference component combining portion 42 to recognize combining rates applied to luminance component image side pixels having the same coordinates as those of a color-difference component image side attention pixel among at least one combining rates with respect to each pixel stored in the buffer.

The composite color-difference component image data generated by the color-difference component combining portion 42 is fed to the saturation emphasizing portion 43.

The saturation emphasizing portion 43 multiples the pixel value of each attention pixel of a composite color-difference component image by a certain gain to thereby emphasize saturation of the attention pixel.

Because the saturation emphasizing portion 43 performs processing with respect to each attention pixel as described above, again is set with respect to each pixel set as an attention pixel. In detail, when the saturation level is low or high, the gain of emphasis is suppressed.

Incidentally, as for the level of emphasis performed by the saturation emphasizing portion 43, it is preferable that an S value calculated in an HSV space transformed from a YUV space is used for emphasis.

If computational load of processing is considered, larger one of the absolute values of a U value and a V value is used as shown in a function represented by the expression (5):

$$S\_lev = max(|U\_mix|, |V\_mix|) \quad (5)$$

in which S_lev is a saturation level, U_mix is a U value of each attention pixel of a composite color-difference component image, and V_mix is a V value of the attention pixel of the composite color-difference component image.

Accordingly, when a pixel in a low or high saturation region among composite color-difference component image data is set as an attention pixel, the gain is suppressed.

As a result, it is possible to prevent color saturation caused by the gain and unnecessary saturation emphasis for a gray region.

Composite color-difference component image data having saturation emphasized by the saturation emphasizing portion 43 is outputted as output data of the color-difference component combining section 22.

Figure 8:
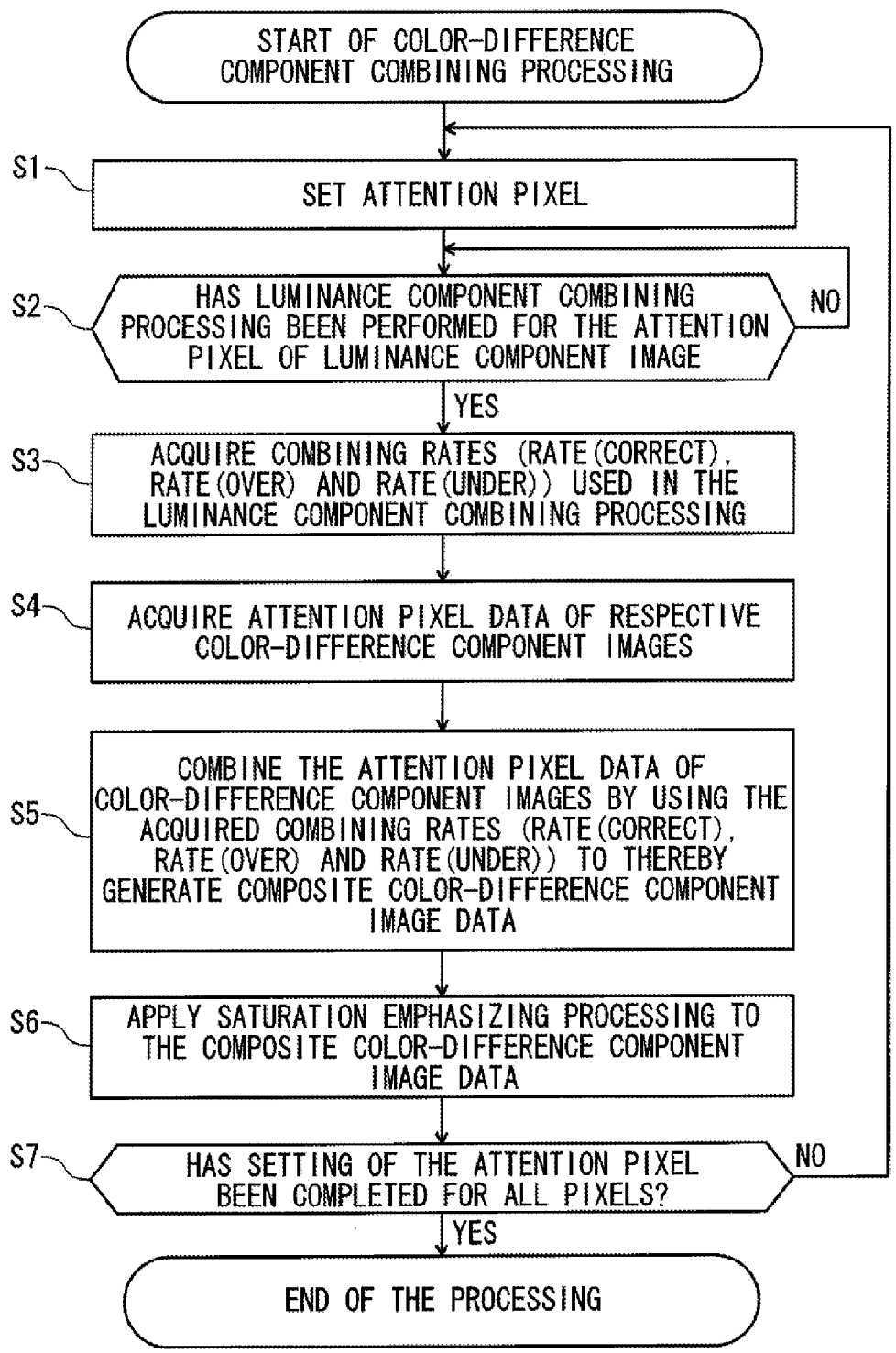
FIG. 8 is a flow chart showing an example of a flow of color-difference component combining processing performed by a color-difference component combining section in FIG. 2.

The color-difference component combining processing performed by the color-difference component combining section 22 of FIG. 2 configured as described above will be described with reference to a flow chart of FIG. 8.

In step S1, the color-difference component combining section 22 sets, as an attention pixel, a pixel located in certain coordinates among pixels constituting each of correct exposure color-difference component image data, overexposure color-difference component image data and underexposure color-difference component image data.

Assume that a pixel included in a luminance component image and located in the same coordinates as those of the attention pixel of the color-difference component image is set as an attention pixel of the luminance component image.

In step S2, the color-difference component combining section 22 determines whether a luminance component combining processing has been performed for the attention pixel of the luminance component image or not.

When the luminance component combining processing is being performed for the attention pixel of the luminance component image, the color-difference component combining section 22 determines NO in the step S2 and processing goes back to the step S2.

That is, when the luminance component combining processing is being performed for the attention pixel of the luminance component image, the determination processing in the step S2 is performed so repeatedly that the color-difference component combining processing stands by.

When the luminance component combining processing for the attention pixel of the luminance component image is then completed, the color-difference component combining section 22 determines YES in the step S2 and processing goes to step S3.

In the step S3, the combining rate acquisition portion 41 of the color-difference component combining section 22 acquires combining rates used in the luminance component combining processing for the attention pixel of the luminance component image.

That is, Rate(correct), Rate(over) and Rate(under) are acquired by the combining rate acquisition portion 41 when the aforementioned expression (1) is calculated for each attention pixel.

In step S4, the color-difference component combining portion 42 acquires data of respective attention pixels in a plurality of color-difference component image data different in exposure.

That is, in this embodiment, data of respective attention pixels in correct exposure color-difference component image data, overexposure color-difference component image data and underexposure color-difference component image data are acquired.

In step S5, the color-difference component combining portion 42 combines correct exposure color-difference component image data, overexposure color-difference component image data and underexposure color-difference component image data by using the combining rates Rate(correct), Rate(over) and Rate(under) acquired by processing in the step S3 to thereby generate composite color-difference component image data.

In step S6, the saturation emphasizing portion 43 applies a saturation emphasizing processing to the composite color-difference component image data.

In step S7, the color-difference component combining section 22 determines whether all pixels have been set and processed as an attention pixel or not.

When there is any pixel data which has been not set as an attention pixel and processed among pixel data constituting each of correct exposure color-difference component image data, overexposure color-difference component image data and underexposure color-difference component image data, the color-difference component combining section 22 determines NO in the step S7 and processing goes back to the step S1 to repeat the step S1 and steps after the step S1.

That is, whenever one of pixels constituting each of correct exposure color-difference component image data, overexposure color-difference component image data and underexposure color-difference component image data is successively set as an attention pixel, the loop processing of the steps S1 to S7 is performed repeatedly to generate composite color-difference component image data.

When the final pixel is set as an attention pixel by processing in the step S1 and processing of the steps S2 to S6 is performed, composite color-difference component image data is completed. Accordingly, the color-difference component combining section 22 determines YES in the next step S7 and the color-difference component combining processing is terminated. Then, the composite image subjected to the image combining processing is filed together with the composite luminance component image data and recorded in the image recording portion 6.

As described above, when a plurality of image data different in exposure are separated into a plurality of luminance component image data having luminance components and a plurality of color-difference component image data having color-difference components, the luminance component combining section 21 in FIG. 2 combines the plurality of separated luminance component image data using certain combining rates. On the other hand, the color-difference component combining section 22 combines the plurality of separated color-difference component image data using combining rates equal (or substantially equal) to those used in the luminance component combining portion 21.

Accordingly, because it is possible to obtain not only composite luminance component image data having adjusted luminance but also composite color-difference component image data having adjusted saturation, HDR composite image data obtained as a result of addition of the composite luminance component image data and the composite color-difference component image data is provided as image data having a wider dynamic range with less whiteout and shadowing compared to the related art and having correctly adjusted saturation.

Particularly when the luminance component combining section 21 combines each pixel data of the same coordinates in a plurality of luminance component images by using combining rates different with respect to each of coordinates, and the color-difference component combining section 22 combines each pixel data of the same coordinates in a plurality of color-difference component images by using the same combining rates for coordinates in the color-difference component images as those for the coordinates, adaptive adjustment can be made with respect to each pixel. Accordingly, the effect becomes remarkable.

Incidentally, the invention is not limited to the aforementioned embodiment and modifications, improvements, etc. may be included in the invention within a range in which the object of the invention can be achieved.

For example, in the aforementioned embodiment, data smoothed by applying an $\epsilon$ filter to average luminance component image data obtained by averaging a plurality of luminance component image data different in exposure is used as average luminance component image data used in the luminance component combining processing.

However, the average luminance component image data is not particularly limited thereto but data obtained by applying a general Low Pass Filter (LPF) instead of the $\epsilon$ filter to average luminance component image data may be used.

However, use of the $\epsilon$ filter as shown in this embodiment is preferred to use of the general LPF. The reason why use of the $\epsilon$ filter is preferred will be described below.

That is, in the Y component combining processing performed by the luminance component combining portion 21, overshooting or undershooting is generated when contrast is emphasized by the contrast emphasizing portion 36 or composite luminance component image data is generated by the luminance component combining portion 33 prior to the contrast emphasizing portion 36.

The $\epsilon$ filter has an effect in reducing generation of such overshooting or undershooting. That is, the $\epsilon$ filter uses pixel value differences between an attention pixel and ambient pixels as local information so that only a region having a small luminance difference can be blurred effectively while a region having a large luminance difference is sustained compared to the general LPF. As a result, the effect of reducing generation of overshooting or undershooting can be fulfilled.

Incidentally, average luminance component image data having a large amount of blurring is required so that the luminance component combining portion 21 can perform the Y component combining processing to generate preferred composite luminance component image data. Because the $\epsilon$ filter for generating such data needs to have a large size, increase in processing quantity and processing time may be a problem.

When such a problem needs to be avoided or reduced, a not-shown scale-down portion for scaling down the size of average luminance component image data outputted from the averaging portion 31, for example, to Quarter VGA (QVGA) may be provided in the image combining portion 11. In this case, the $\epsilon$ filter portion 32 applies an $\epsilon$ filter to the scaled-down image data, so that the size of the $\epsilon$ filter can be reduced. As a result, both processing quantity and processing time can be reduced. Incidentally, because the size of data outputted from the ε filter portion 32 remains as QVGA, a scale-up portion for scaling up the size of the output data to the original size needs to be provided in the image combining portion 11.

Incidentally, in this case, because the edge of a reference luminance component image becomes slow as the scale-down rate of the scale-down portion or the scale-up rate of the scale-up portion increases, it is necessary to pay attention to the fact that the effect of the ε filter, that is, the effect of reducing overshooting or undershooting is slightly weakened.

Although the embodiment has been described in the case where three image data are combined as a plurality of image data different in exposure by way of example, the number of image data to be combined is not limited thereto particularly. That is, the invention can be widely applied to the case where two image data or an arbitrary number of image data more than two image data are combined.

Although the embodiment has been described without consideration of the presence of a face image region during image combining, a well-known face image region detecting technique may be used for detecting a face image region at least during either of image capturing and image combining to perform image capturing control or image combining control in consideration of the brightness of the detected face image.

In the case where a face image region is detected during image-capturing, control is made so that correct exposure, underexposure and overexposure component image data are acquired by image capturing with reference to exposure setting to optimize the brightness of the face. During image combining, the combining rates can be set so that luminance component image data acquired as to a face portion under correct exposure is used.

During image combining, detection of each face image region may be tried with respect to all acquired image data.

Although it will go well as long as a face image region can be detected from at least one of image data, image data closest to correct exposure image data is selected from image data including a face image region even when the face image region is detected from a plurality of image data.

Incidentally, a bright image having an exposure value close to image data captured in a correct exposure value may be selected to reduce the aforementioned selecting processing.

Then, the brightness average of the face image region in the selected image data is measured and a nonlinear gamma transformation or the like is applied in accordance with the measured exposure so that overexposure and underexposure luminance component image data to be used in the image combining processing is selected from the plurality of image data.

The combining rates are set based on the brightness of the face image region.

After combining rates are set for luminance component image data in this manner, color-difference component images are subjected to a combining processing in accordance with the combining rates so that saturation emphasis is applied.

Incidentally, a plurality of image data different in exposure to be combined are not particularly limited to the specific examples shown in the aforementioned drawings. For example, setting of exposure at the time of capturing a plurality of image data to be combined is not limited to the specific examples shown in the aforementioned drawings but any setting of exposure may be used as long as exposure varies.

Although there is no particular mention in the aforementioned embodiment, it is preferable that position displacement is corrected in advance in consideration of the fact that a plurality of image data different in exposure are combined.

For example, the embodiment has been described in the case where the image processing apparatus to which the invention is applied is formed as a digital camera by way of example.

However, the invention is not particularly limited thereto but the invention can be applied to a general electronic apparatus having an image processing function. For example, the invention can be widely applied to a digital photo frame, a personal computer, a portable navigation apparatus, a portable game machine, etc.

In other words, the aforementioned series of processing can be performed by hardware or can be performed by software.

Figure 9:
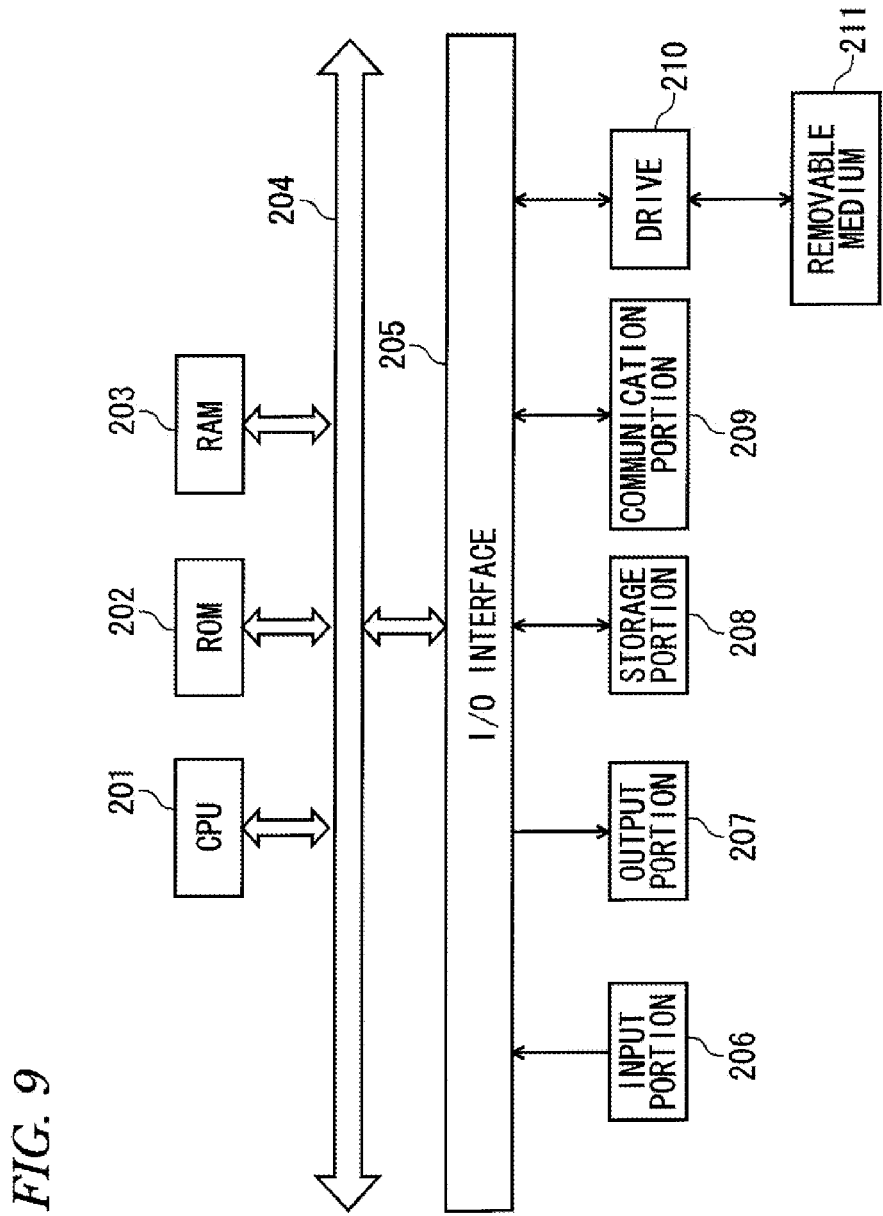
FIG. 9 is a block diagram showing hardware configuration of an image processing apparatus according to the embodiment.

FIG. 9 is a block diagram showing hardware configuration of an image processing apparatus according to the embodiment when the aforementioned series of processing is performed by software.

In the example shown in FIG. 9, the image processing apparatus has a Central Processing Unit (CPU) 201, a Read Only Memory (ROM) 202, a Random Access Memory (RAM) 203, a bus 204, an I/O interface 205, an input portion 206, an output portion 207, a storage portion 208, a communication portion 209, and a drive 210.

The CPU 201 performs various kinds of processing in accordance with programs stored in the ROM 202. Or the CPU 201 performs various kinds of processing in accordance with programs loaded from the storage portion 208 to the RAM 203.

The RAM 203 further appropriately stores data, etc. necessary for the CPU 201 to perform various kinds of processing.

For example, in this embodiment, programs for carrying out the function of the image combining portion 11 are stored in the ROM 202 or the storage portion 208. Accordingly, when the CPU 201 performs processing in accordance with these programs, the function of the image combining portion 11 can be carried out.

The CPU 201, the ROM 202 and the RAM 203 are connected to one another through the bus 204. The I/O interface 205 is also connected to the bus 204. The input portion 206, the output portion 207, the storage portion 208 and the communication portion 209 are connected to the I/O interface 205.

The input portion 206 is composed of operation portions having various buttons etc. The input portion 206 accepts user's instruction operations and inputs various kinds of information.

The output portion 207 outputs various kinds of information. For example, a display portion not shown is provided in the output portion 207 to display a composite image expressed in output data of the image combining portion 11.

The storage portion 208 is composed of a hard disk, a Dynamic Random Access Memory (DRAM), etc. The storage portion 208 stores various kinds of information.

The communication portion 209 controls communication with another device (not shown) through a network including Internet.

The drive 210 is further connected to the I/O interface 205 if necessary. A removable medium 211 such as a magnetic disk, an optical disc, a magneto-optical disc, a semiconductor memory, etc. is appropriately mounted in the drive 210. Programs read from the removable medium 211 by the drive 210 are installed in the storage portion 208 if necessary. Various kinds of data such as image data stored in the storage portion 208 can be stored in the removable medium 211 in the same manner as in the storage portion 208.

When the series of processing is to be performed by software, programs constituting the software are installed in a computer or the like through a network or a recording medium. The computer may be a computer incorporated in exclusive hardware. The computer may be a computer such as a general-purpose personal computer which can perform various functions based on various programs installed therein.

A recording medium including such programs may be formed as the removable medium 211 distributed separately from the apparatus body to provide programs to the user or may be formed as a recording medium, etc. which is provided to the user in the condition that the programs are preinstalled in the apparatus body. For example, the removable medium 211 is made of a magnetic disk (inclusive of a floppy disk), an optical disc, a magneto-optical disc, etc. For example, the optical disk is made of a Compact Disk-Read Only Memory (CD-ROM), a Digital Versatile Disc (DVD), etc. The magneto-optical disc is made of a Mini-Disc (MD), etc. For example, the recording medium provided to the user in the condition that programs are preinstalled in the apparatus body is made of the ROM 202 in which programs are stored, a hard disk included in the storage portion 208, etc.

In this specification, it is a matter of course that steps describing programs recorded on the recording medium include not only processing performed in time series in this order but also processing which are not always performed in time series but performed concurrently or individually.

What is claimed is:

1. An image combining apparatus comprising:
   a selecting unit configured to select at least overexposure image data and underexposure image data based on correct exposure image data from a plurality of first image data which are separated from each of a plurality of image data captured in different exposures, each of the plurality of first image data being composed of luminance components specified in a certain color space;
   a generating unit configured to generate smoothed image data by averaging the selected plurality of first image data selected by the selecting unit so as to smooth the selected plurality of first image data;
   a first combining unit configured to combine data of each pixel located in the same position of the separated plurality of first image data, by using certain combining rates which are different according to coordinates and which are based on a luminance value of the generated image data generated by the generating unit; and
   a second combining unit configured to combine data of each pixel of a plurality of second image data which correspond to the selected first image data selected by the selecting unit and which pixel data is located in the same position as in the first image data, by using the certain combining rates which are the same combining rates used in the first combining unit and which are used at the same positions as in the first image data, each of the plurality of second image data which being separated from each of the plurality of image data captured in different exposures and being composed of components other than luminance components specified in a certain color space.

2. The image combining apparatus according to claim 1, wherein:
   the first combining unit additionally sets gains for adjusting brightness of the combined first image data with respect to each of the plurality of first image data;
   the first combining unit adjusts the certain combining rates by multiplying the certain combining rates by the set gains, and
   the second combining unit combines the second image data by using the certain combining rates adjusted by the first combining unit.

3. The image combining apparatus according to claim 1, further comprising:
   an image region detection unit configured to detect a face image region from at least one of the plurality of image data captured in different exposures,
   wherein the first combining unit adjusts the certain combining rates based on brightness of image data where brightness in the face image region is correct when the face image region is detected by the image region detection unit.

4. The image combining apparatus according to claim 1, further comprising:
   an imaging unit;
   an image region detection unit configured to detect a face image region from image data captured by the imaging unit; and
   an image capturing control unit configured to adjust an exposure value to make the face image region correctly bright and to perform control to capture a plurality of image data in different exposures based on the adjusted exposure value when the face image region is detected by the image region detection unit.

5. The image combining apparatus according to claim 1, wherein the second combining unit additionally multiplies gains for emphasizing saturation with respect to the combined second image data.

6. A non-transitory computer-readable recording medium having a program stored thereon that is executable to cause a computer to control an image processing apparatus to perform image processing with respect to image data comprising:
   selecting at least overexposure image data and underexposure image data based on correct exposure image data from a plurality of first image data which are separated from each of a plurality of image data captured in different exposures, each of the plurality of first image data being composed of luminance components specified in a certain color space;
   generating smoothed image data by averaging the selected plurality of first image data so as to smooth the selected plurality of first image data;
   first combining data of each pixel located in the same position of the separated plurality of first image data, by using certain combining rates which are different according to coordinates and which are based on a luminance value of the generated image data; and
   second combining data of each pixel of a plurality of second image data which correspond to the selected first image data and which pixel data is located in the same position as in the first image data, by using the certain combining rates which are the same combining rates used in the first combining step and which are used at the same positions as in the first image date, each of the plurality of second image data being separated from each of the plurality of image data captured in different exposures and being composed of components other than luminance components specified in a certain color space.

* * * * *